(12) United States Patent
Hong et al.

(10) Patent No.: US 11,104,833 B2
(45) Date of Patent: Aug. 31, 2021

(54) HYDROFLUOROOLEFINS-CONTAINING REFRIGERANT COMPOSITION

(71) Applicant: Zhejiang Quhua Fluor-Chemistry Co Ltd, Zhejiang (CN)

(72) Inventors: Jiangyong Hong, Zhejiang (CN); Bo Yang, Zhejiang (CN); Aiguo Wang, Zhejiang (CN); Yan Zhang, Zhejiang (CN); Yang Zhao, Zhejiang (CN); Hao Ouyang, Zhejiang (CN)

(73) Assignee: Zhejiang Quhua Fluor-Chemistry Co Ltd, Zhejiang (CN)

( * ) Notice: Subject to any disclaimer, the term of this patent is extended or adjusted under 35 U.S.C. 154(b) by 580 days.

(21) Appl. No.: 16/075,988

(22) PCT Filed: Jul. 21, 2017

(86) PCT No.: PCT/CN2017/000460
§ 371 (c)(1),
(2) Date: Aug. 7, 2018

(87) PCT Pub. No.: WO2018/120257
PCT Pub. Date: Jul. 5, 2018

(65) Prior Publication Data
US 2021/0189207 A1   Jun. 24, 2021

(30) Foreign Application Priority Data

Dec. 26, 2016 (CN) .......................... 201611218155.8

(51) Int. Cl.
*C09K 5/04* (2006.01)
(52) U.S. Cl.
CPC ........ *C09K 5/045* (2013.01); *C09K 2205/122* (2013.01); *C09K 2205/126* (2013.01); *C09K 2205/22* (2013.01)
(58) Field of Classification Search
CPC ............. C09K 5/045; C09K 2205/126; C09K 2205/122; C09K 2205/22
USPC .......................... 252/67, 68, 69; 62/529, 467
See application file for complete search history.

(56) References Cited

U.S. PATENT DOCUMENTS

| | | | |
|---|---|---|---|
| 9,175,202 B2 * | 11/2015 | Low | ......................... F25B 45/00 |
| 2009/0253820 A1 * | 10/2009 | Bowman | .................... C08J 9/14 |
| | | | 521/170 |
| 2015/0315447 A1 | 11/2015 | Low | |
| 2016/0334147 A1 * | 11/2016 | Dixon | .................. C10M 105/38 |
| 2017/0074747 A1 * | 3/2017 | Scancarello | ........... C09K 5/041 |
| 2018/0030325 A1 * | 2/2018 | Petersen | ............... F25B 31/002 |
| 2018/0051198 A1 * | 2/2018 | Okamoto | ................ C09K 5/044 |
| 2018/0162795 A1 * | 6/2018 | Bertelo | ................. C07C 17/269 |

FOREIGN PATENT DOCUMENTS

| | | |
|---|---|---|
| CN | 1285699 | 11/2006 |
| CN | 101765648 | 6/2010 |
| CN | 101851490 | 10/2010 |
| CN | 101864277 | 10/2010 |
| CN | 102066518 | 5/2011 |
| CN | 102083935 | 6/2011 |
| CN | 102939351 | 2/2013 |
| CN | 104232022 | 12/2014 |
| CN | 104403637 | 3/2015 |
| CN | 106833536 | 6/2017 |

OTHER PUBLICATIONS

"International Search Report (Form PCT/ISA/210)", dated Sep. 27, 2017, with English translation thereof, pp. 1-6.
"Search Report of Europe Counterpart Application", dated Jun. 18, 2020, p. 1-p. 5.

* cited by examiner

*Primary Examiner* — Douglas J McGinty
(74) *Attorney, Agent, or Firm* — JCIPRNET

(57) ABSTRACT

A hydrofluoroolefins-containing refrigerant composition is disclosed. The composition includes the following ingredients in part by weight: 50-90 parts of 2,3,3,3-tetrafluoropropene, 5-30 parts of trans-1,3,3,3-tetrafluoropropene, and 5-20 parts of fluoroethane. The composition of this invention has the advantages of low GWP, environmental friendliness, good refrigeration effect and high compatibility with lubricants.

9 Claims, No Drawings

HYDROFLUOROOLEFINS-CONTAINING REFRIGERANT COMPOSITION

CROSS-REFERENCE TO RELATED APPLICATION

This application is a 371 of international application of PCT application serial no. PCT/CN2017/000460, filed on Jul. 21, 2017, which claims the priority benefit of China application no. 201611218155.8, filed on Dec. 26, 2016. The entirety of each of the above-mentioned patent applications is hereby incorporated by reference herein and made a part of this specification.

BACKGROUND

1. Field of the Invention

The invention relates to refrigerant compositions, in particular to a hydrofluoroolefins-containing refrigerant composition.

2. Description of Related Art

In accordance with the Montreal Protocol and the Kyoto Protocol, all countries have imposed stricter and stricter requirements on substitutions for the refrigerant CFC-12 (dichlorodifluoromethane). In addition to a basic requirement that new refrigerants cannot damage the ozone layer, new refrigerants are also required to have a GWP (Global Warming Potential) as low as possible.

At present, a main substitute for the refrigerant CFC-12 that is available on the market is HFC-134a (1,1,1,2-tetrafluoroethane). HFC-134a has good thermal performance and 0 ODP (Ozone Depleting Potential) and is incombustible, but HFC-134a does not meet the current global requirements for energy conservation and emission reduction because its GWP is 1,370. Therefore, there is an urgent need to research and develop a novel refrigerant with higher environmental performance and with a thermal performance which is not inferior to the thermal performance of HFC-134a.

The third-generation of refrigerants, represented by HFC, have zero ODP, do not damage the ozone layer, but have relatively high GWPs, and thus are listed as greenhouse gases in accordance with the Kyoto Protocol. The European Parliament passed the F-gas law to limit the use of fluoride-containing gases with a high GWP. The 28th Conference of the Parties of the Montreal Protocol on Substances that Deplete the Ozone Layer, held on Oct. 25, 2016, with nearly 200 participating countries, smoothly passed the Protocol Amendments on the Reduction of Hydrofluorocarbons (HFCs) in Kigali, the capital of Rwanda. The countries made a time schedule protocol on the reduction of HFCs, and the international community reached an agreement on its responses to climate changes.

HFO-1234yf (2,3,3,3-tetrafluoropropene), with a molecular formula of $CH_2=CFCF_3$, a relative molecular weight of 114.04, a standard boiling point of −29.5° C., a critical temperature of 94.7° C. and a critical pressure of 3.38 MPa, has good thermal performance and an extremely low exhaust temperature, and in severe conditions, can prevent an excessively high exhaust temperature from damaging the coils of compressor motors, and can also prevent excessively high temperatures from worsening the lubrication conditions of the compressor and completely decomposing such lubricants. As a single-medium refrigerant, HFO-1234yf has excellent environmental parameters, for example, ODP=0, GWP=4, an LCCP (Life Cycle Climate Performance) which is less than that of HFC-134a, and the atmospheric decomposition products of HFO-1234yf are identical with those of HFC-134a. Under the same automotive air conditioning case, the refrigeration coefficient of HFO-1234yf is smaller than that of HFC-134a, and the refrigerating capacity of the unit volume is also smaller, but HFO-1234yf has a very low exhaust temperature while having a large saturation liquid specific volume. If HFO-1234yf is selected to replace the refrigerant HFC-134a, automobile manufacturers can continue to use the original mobile air-conditioning (MAC) system. Therefore, HFO-1234yf is deemed as a potential substitute for a new-generation of automotive refrigerants. At present, HFO-1234yf has been accepted by the automobile manufacturers of Western Europe, and has been gradually popularized since 2011. HFO-1234yf has a GWP and an atmospheric life which are obviously environmentally superior to those of other refrigerants replacing HFC-134a, but has low combustibility and a potential hazard of causing fires.

In addition, when the refrigerant composition is applied to refrigeration systems, the compatibility of the refrigerant composition and the lubricant need to be considered. In a refrigeration, air conditioning, or heat transfer system, it is expected that the lubricant and the refrigerant may contact each other in at least one part of the system, for example, the description in an ASHRAE manual: an HVAC system and a device. Therefore, regardless of whether the lubricant and the refrigerant are added into a refrigeration, air conditioning, or heat transfer system separately or as a part of a pre-mixed package, it is still expected that lubricants and the refrigerants will make contact with each other and must be compatible within the system.

When the refrigerant composition is applied to the refrigerant system, sufficient lubricant must be returned to a compressor of the system to lubricate the compressor. The suitability of the lubricant depends on the characteristics of the refrigerant/lubricant and the characteristics of the system itself. At present, the lubricants applied to hydrofluorocarbon (HFC) refrigeration systems and hydrochlorofluorocarbon (HCFC) refrigeration systems include mineral oils, silicone oil, polyalkylbenzene, polyalkylene glycol, polyalkylene glycol ester, polyol ester and polyvinyl ether. For an HFC refrigeration system, polyalkylene glycol, polyalkylene glycol ester, polyvinyl ether and polyol ester are usually preferred as refrigerants. For an HCFC refrigerant system, mineral oils or polyalkylbenzene is usually used as the lubricant.

At the same time, based on the above concept, researchers developed various HFO-1234yf-based compositions. Other ingredients are added to enhance the refrigeration effect and improve the compatibility with lubricating oils. Meanwhile, adverse factors are reduced to the maximum extent by combining the advantages of all ingredients.

For example, a Chinese patent, CN1285699C, discloses a ternary composition composed of fluoroethane (HFC-161), 1,1-difluoroethane (HFC-152a) and 1,1,1,2-tetrafluoroethane (HFC-134a).

A Chinese patent, CN101765648A, discloses a mixture of 1,2,3,3,3-pentafluoropropene (HFO-1225ye) and other compounds.

A Chinese patent, CN101851490A, discloses a mixture of 2,3,3,3-tetrafluoropropene (HFO-1234yf), trans-1,3,3,3-tetrafluoroethane (HFC-1234ze(E)) and 1,1-difluoroethane (HFC-152a).

A Chinese patent, CN101864277A, discloses a mixture of 2,3,3,3-tetrafluoropropene (HFO-1234yf), 1,1-difluoroethane (HFC-152a) and dimethyl ether (DME).

A Chinese patent, CN102066518A, discloses a mixture of 2,3,3,3-tetrafluoropropene (HFO-1234yf), 1,1,2-tetrafluoroethane (HFC-134a) and 1,1-difluoroethane (HFC-152a).

A Chinese patent, CN102083935A, discloses a mixture of 1,1,1,2-tetrafluoroethane (HFC-134a) and 2,3,3,3-tetrafluoropropene (HFO-1234yf).

A Chinese patent, CN104403637A, discloses a tetrafluoropropene composition with high lubricant compatibility and a preparation method thereof. According to parts by weight, the tetrafluoropropene composition includes 0.4-15 parts of fluorine modified Ni-containing hydrotalcite, 0.002-0.25 parts of silane coupling agent, 49.5-985 parts of lubricant, 4,000-90,000 parts of 2,3,3,3-tetrafluoropropene, 0-60,000 parts of fluoroethane, 0-15,000 parts of 1,1-difluoroethane, 0-5,000 parts of iso-butane, and 0.8-1 part of bis(trifluoromethanesulphonyl)imidolated-3-methyl-1-propylpyridine.

The refrigerant compositions disclosed in the above patents have defects such as high GWP, failure to be directly filled into and applied to the refrigeration systems, high combustibility, or failure to use mineral oils. Therefore, it is required to develop a new refrigerant which is more compatible with the existing systems and has higher environmental performance.

SUMMARY

The technical problem to be solved by this invention is to provide a green, environmentally-friendly, hydrofluoroolefins-containing refrigerant composition with a good refrigeration effect, high compatibility with lubricants, and a low GWP to overcome the defects in the prior art.

In order to solve the above technical problems, this invention adopts the following technical solution. A hydrofluoroolefins-containing refrigerant composition which includes the following ingredients in parts by weight: 50-90 parts of 2,3,3,3-tetrafluoropropene, 5-30 parts of trans-1,3,3,3-tetrafluoropropene, and 5-20 parts of fluoroethane.

Preferably, the hydrofluoroolefins-containing refrigerant composition includes the following ingredients in parts by weight: 60-80 parts of 2,3,3,3-tetrafluoropropene, 15-30 parts of trans-1,3,3,3-tetrafluoropropene, and 5-10 parts of fluoroethane.

Preferably, the hydrofluoroolefins-containing refrigerant composition includes the following ingredients in parts by weight: 70-80 parts of 2,3,3,3-tetrafluoropropene, 15-20 parts of trans-1,3,3,3-tetrafluoropropene, and 5-10 parts of fluoroethane.

This invention also discloses a preparation method for the hydrofluoroolefins-containing refrigerant composition. Namely, ingredients in a liquid-phase state are physically mixed according to their weight ratios to obtain the refrigerant composition.

The global warming potential of the composition of this invention is not greater than 10.

The hydrofluoroolefins-containing refrigerant composition of this invention may be applied to air conditioning systems of automobiles, passenger vehicles and railways, household refrigeration systems, commercial refrigeration systems, industrial refrigeration systems and cooling water unit systems.

When the hydrofluoroolefins-containing refrigerant composition of the invention is applied to the above systems, at least one of the following additives is added into the refrigerant composition: lubricants, solubilizers, dispersants and foaming stabilizers. The lubricant is preferably selected from mineral oil, silicone oil, and polyol esters.

When the hydrofluoroolefins-containing refrigerant composition of this invention is applied to the above systems, an ether compound is preferably added into the refrigerant composition. The ether compound may be selected from dimethyl ether, aryl ether, hydrofluorinated ether, polyoxyalkylene glycol ether, etc. The ether compound may be any one preferably selected from dimethyl ether, trifluorovinyl aryl ether, 1,1,2,2-tetrafluoroethyl methyl ether, 1,1,2,2-tetrafluoroethyl-2,2,2-trifluoroethyl ether, and polyglycol ether.

In accordance with the invention, HFO-1234yf (2,3,3,3-tetrafluoropropene), with a molecular formula of $CH_2=CFCF_3$, a relative molecular weight of 114.04, a standard boiling point of $-29.5°$ C., a critical temperature of 94.7° C. and a critical pressure of 3.38 MPa, has high thermal performance and an extremely low exhaust temperature, and under severe conditions, can prevent an excessively high exhaust temperature from damaging the coils of compressor motors, and also can prevent excessively high temperatures from worsening the lubrication conditions of the compressor and completely decomposing lubricants. As a single-medium refrigerant, HFO-1234yf has excellent environmental parameters, including ODP=0, GWP=4, and an Life cycle climate performance (LCCP) less than that of HFC-134a, and the atmospheric decomposition products of HFO-1234yf are identical with those of HFC-134a. Under the same automotive air conditioning case, the refrigeration coefficient of HFO-1234yf is smaller than that of HFC-134a, and the refrigerating capacity of the unit volume is also smaller, but HFO-1234yf has a very low exhaust temperature while having a large saturation liquid specific volume. If the HFO-1234yf is selected to replace the HFC-134a refrigerant, automobile manufacturers can continue to use the original mobile air-conditioning (MAC) system.

The HFO-1234ze (1,3,3,3-tetrafluoropropene) of the invention is E-type, has a boiling point of $-19°$ C., is incombustible and non-toxic, has excellent environmental parameters, ODP=0, GWP=6, and has a service life climate performance (LCCP) lower than that of HFC-134a. The atmospheric compounds of HFO-1234ze are identical with those of R134a. The system performance of HFO-1234ze is higher than that of R134a. Therefore, HFO-1234ze is deemed as the most potential fourth-generation refrigerant to replace R134a to be used in the industries of refrigerants, foaming agents, and aerosol propellants.

HFC-161 of this invention has 0 ODP, an extremely low GWP of 12, which is merely 0.66% of the GWP of the HCFC-22 and equivalent to the GWP of the hydrocarbon. At the same time, HFC-161 has a POCP (Photochemical Ozone Creation Potential) far smaller than that of other hydrocarbons, and comprehensive environmental performance superior to that of HCFC-22 and hydrocarbons. HFC-161 has basic physical parameters similar to those of HCFC-22, and has a saturated vapor pressure curve slightly lower than that of HCFC-22 and similar to that of R-290.

The hydrofluoroolefins-containing refrigerant composition of this invention is prepared by mixing 2,3,3,3-tetrafluoropropene, trans-1,3,3,3-tetrafluoropropene, and fluoroethane, integrating the advantages of all ingredients, and reducing the adverse factors to the maximum extent. The composition of this invention has the advantages of low GWP, environmental friendliness, good refrigeration effect, and high lubricant compatibility.

All materials in the invention are available on the market.

Compared with the prior art, this invention has the following advantages:

1. The saturation liquid specific volume is relatively large and capable of greatly reducing the amount of refrigerant filled into the refrigeration system.
2. The environmental performance is high; the ODP is 0; and the GWP is greatly reduced relative to the HFC.
3. The exhaust temperature is low; the service life of the compressor is prolonged; and the reliability of the refrigerating equipment is enhanced.
4. Both synthetic oil and mineral oil can be used to reduce cost.
5. The refrigeration coefficient, refrigerating capacity of the unit volume and running pressure are all similar to those of HFC; the refrigerant composition of this invention can directly replace the existing refrigerants, without changing the compressor.
6. The refrigerant composition has high flame retardancy.

DESCRIPTION OF THE EMBODIMENTS

The invention is described in further detail in conjunction with the specific embodiments. However, the invention is not limited to the embodiments.

Embodiment 1

90 kg of 2,3,3,3-tetrafluoropropene, 5 kg of 1,3,3,3-tetrafluoropropene, and 5 kg of fluoroethane in the liquid-phase state were physically mixed to obtain a refrigerant composition.

Embodiment 2

80 kg of 2,3,3,3-tetrafluoropropene, 15 kg of 1,3,3,3-tetrafluoropropene, and 5 kg of fluoroethane in the liquid-phase state were physically mixed to obtain a refrigerant composition.

Embodiment 3

70 kg of 2,3,3,3-tetrafluoropropene, 20 kg of 1,3,3,3-tetrafluoropropene, and 10 kg of fluoroethane in the liquid-phase state were physically mixed to obtain a refrigerant composition.

Embodiment 4

60 kg of 2,3,3,3-tetrafluoropropene, 20 kg of 1,3,3,3-tetrafluoropropene, and 20 kg of fluoroethane in the liquid-phase state were physically mixed to obtain a refrigerant composition.

Embodiment 5

50 kg of 2,3,3,3-tetrafluoropropene, 30 kg of 1,3,3,3-tetrafluoropropene, and 20 kg of fluoroethane in the liquid-phase state were physically mixed to obtain a refrigerant composition.

Embodiment 6

70 kg of 2,3,3,3-tetrafluoropropene, 25 kg of 1,3,3,3-tetrafluoropropene, and 5 kg of fluoroethane in the liquid-phase state were physically mixed to obtain a refrigerant composition.

Embodiment 7

80 kg of 2,3,3,3-tetrafluoropropene, 5 kg of 1,3,3,3-tetrafluoropropene, and 15 kg of fluoroethane in the liquid-phase state were physically mixed to obtain a refrigerant composition.

Embodiment 8

75 kg of 2,3,3,3-tetrafluoropropene, 20 kg of 1,3,3,3-tetrafluoropropene, and 5 kg of fluoroethane in the liquid-phase state were physically mixed to obtain a refrigerant composition.

Embodiment 9

70 kg of 2,3,3,3-tetrafluoropropene, 15 kg of 1,3,3,3-tetrafluoropropene, and 15 kg of fluoroethane in the liquid-phase state were physically mixed to obtain a refrigerant composition.

Performance Test:

The performance of the products obtained in Embodiments 1-9 was tested. See Table 1 for the test results. Where:

Burning test: The burning test was carried out according to the American ASTM-E681-01 standard, wherein the LFL is the lower limit value of the combustion limit, and a larger LFL value leads to lower combustibility.

COP test: The products obtained in Embodiments 1-9 and HFO-1234yf were respectively mixed with lubricants and ether compounds, and then the performance of the mixtures was tested. The COP value of HFO-1234yf and the COP values of the products obtained in Embodiments 1-9 were determined at different evaporation temperatures and condensing temperatures.

TABLE 1

Comparison of the performance of the products obtained in Embodiments 1-9 and the performance of HFO-1234yf

| Embodiment | LFL value (volume %) | GWP | COP | Lubricant type | Ether compound |
|---|---|---|---|---|---|
| 1 | 6.15 | 4.5 | 1.55 | Mineral oil | Dimethyl ether |
| 2 | 6.29 | 4.7 | 1.53 | Silicone oil | Dimethyl ether |
| 3 | 6.24 | 5.2 | 1.52 | Silicone oil | Trifluorovinyl aryl ether |
| 4 | 6 | 6 | 1.56 | Polyol esters | 1,1,2,2-tetrafluoroethyl methyl ether (HFE-254) |
| 5 | 6.14 | 6.2 | 1.57 | Polyol esters | 1,1,2,2-tetrafluoroethyl-2,2,2-trifluoroethyl ether (HFE-347) |
| 6 | 6.43 | 4.9 | 1.58 | Polyol esters | Polyglycol ether |
| 7 | 5.91 | 5.3 | 1.60 | Mineral oil | Dimethyl ether |

TABLE 1-continued

Comparison of the performance of the products obtained in Embodiments 1-9 and the performance of HFO-1234yf

| Embodiment | LFL value (volume %) | GWP | COP | Lubricant type | Ether compound |
|---|---|---|---|---|---|
| 8 | 6.36 | 4.8 | 1.62 | Mineral oil | Trifluorovinyl aryl ether |
| 9 | 6.05 | 5.5 | 1.55 | Mineral oil | Trifluorovinyl aryl ether |
| HFO-1234yf | 6.2 | 4 | 1.50 | Mineral oil | Dimethyl ether |

What is claimed is:

1. A composition of a hydrofluoroolefins-containing refrigerant, the composition comprising:
   70-80 parts by weight of 2,3,3,3-tetrafluoropropene;
   15-25 parts by weight of trans-1,3,3,3-tetrafluoropropene; and
   5-10 parts by weight of fluoroethane.

2. The composition of claim 1, wherein the composition comprises:
   70-80 parts by weight of 2,3,3,3-tetrafluoropropene;
   15-20 parts by weight of trans-1,3,3,3-tetrafluoropropene; and
   5-10 parts by weight of fluoroethane.

3. The composition of claim 1, wherein the composition has a global warming potential not greater than 10.

4. A method of preparing a composition of hydrofluoroolefins-containing refrigerant, the method comprising:
   physically mixing ingredients of the hydrofluoroolefins-containing refrigerant composition of claim 1 in liquid phase.

5. A method of using a composition of a hydrofluoroolefins-containing refrigerant, the method comprising:
   adding the composition of claim 1 into an air conditioning system of an automobile, a passenger vehicle and railway, a household refrigeration system, a commercial refrigeration system, an industrial refrigeration system, and a cooling water unit system.

6. The method of claim 5, wherein the composition of claim 1 further comprises at least one of a lubricant, a solubilizer, a dispersant, and a foaming stabilizer.

7. The composition of claim 6, wherein the lubricant is at least one of mineral oils, silicone oils, and polyol esters.

8. The composition of claim 5, wherein the composition of claim 1 further comprises an ether compound.

9. The composition of claim 8, wherein the ether compound is at least one of dimethyl ether, trifluorovinyl aryl ether, 1,1,2,2-tetrafluoroethyl methyl ether, 1,1,2,2-tetrafluoroethyl-2,2,2-trifluoroethyl ether and polyglycol ether.

* * * * *